March 25, 1941.  W. C. DEVEREAUX  2,235,984
HINGE CONSTRUCTION
Filed May 8, 1939  2 Sheets-Sheet 1

INVENTOR.
William C. Devereaux
BY
ATTORNEYS

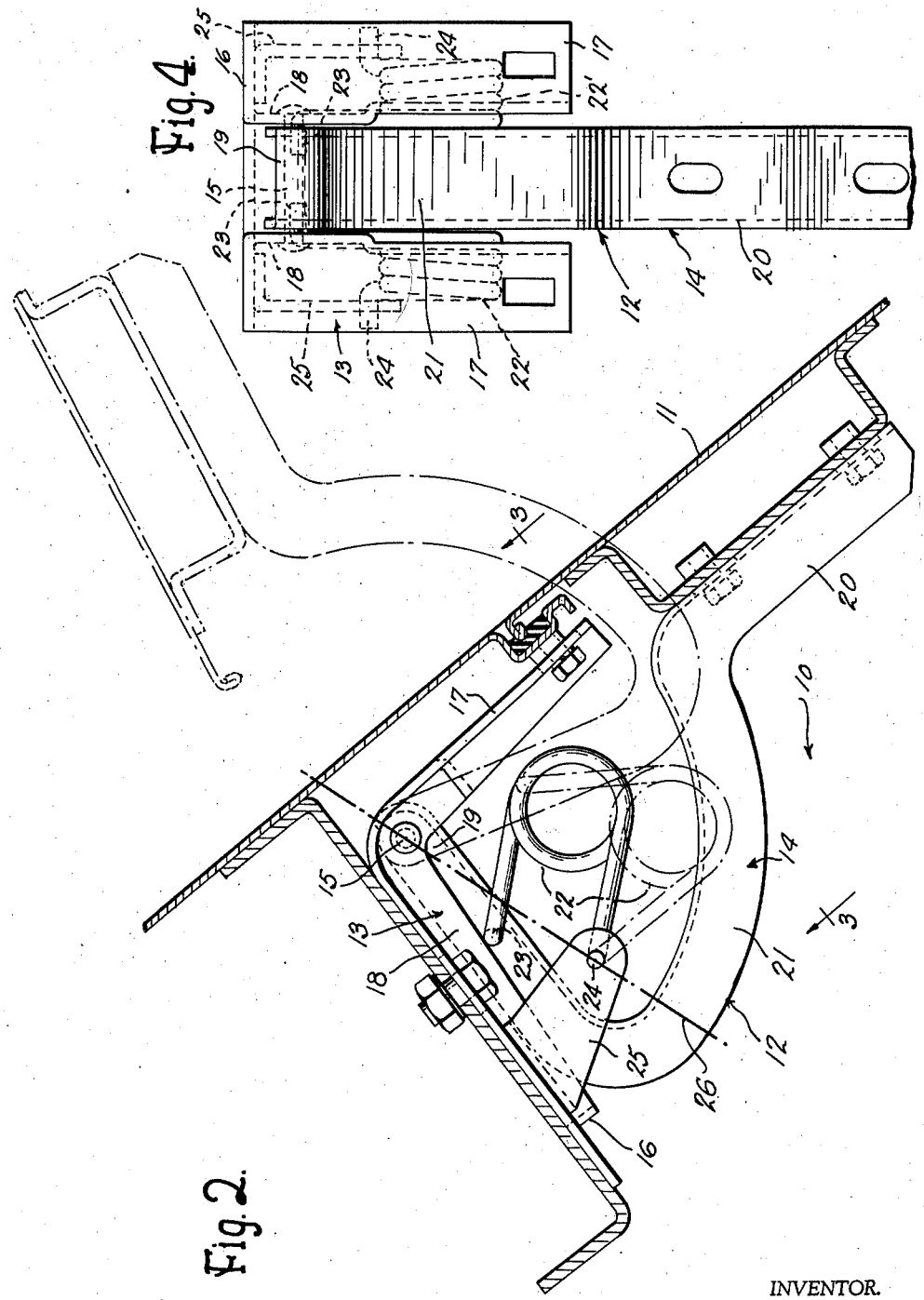

Patented Mar. 25, 1941

2,235,984

UNITED STATES PATENT OFFICE 2,235,984

HINGE CONSTRUCTION

William C. Devereaux, Detroit, Mich.

Application May 8, 1939, Serial No. 272,534

2 Claims. (Cl. 16—135)

This invention relates generally to hinge constructions and refers more particularly to improvements in hinges of the type employed for supporting rear-deck closures on motor vehicle bodies.

Considerable difficulty has heretofore been encountered in developing a satisfactory hinge for use in mounting rear-deck closures on vehicle bodies and one of the most serious problems has been to provide a hinge of such compact construction that it will not appreciably obstruct the storage space provided in the compartment.

It is one of the principal objects of this invention to overcome the foregoing difficulties by providing a compact concealed hinge construction which occupies the minimum space within the storage compartment and at the same time embodies means for effectively holding the closure in both open and closed positions.

Another advantageous feature of this invention resides in the provision of a concealed hinge of the character set forth wherein the means for holding the closure in either its closed or open positions also assists in the movement of the closure to both of said positions.

In addition to the foregoing, the present invention contemplates a concealed hinge embodying the foregoing features and composed of a relatively few simple parts capable of being inexpensively manufactured, assembled and installed.

The foregoing, as well as other objects, will be made more apparent as this description proceeds, especially when considered in connection with the accompanying drawings, wherein—

Figure 2 is an enlarged side elevational view of the hinge shown in Figure 1;

Figure 4 is a top plan view of the hinge shown in Figure 2.

Figure 1:
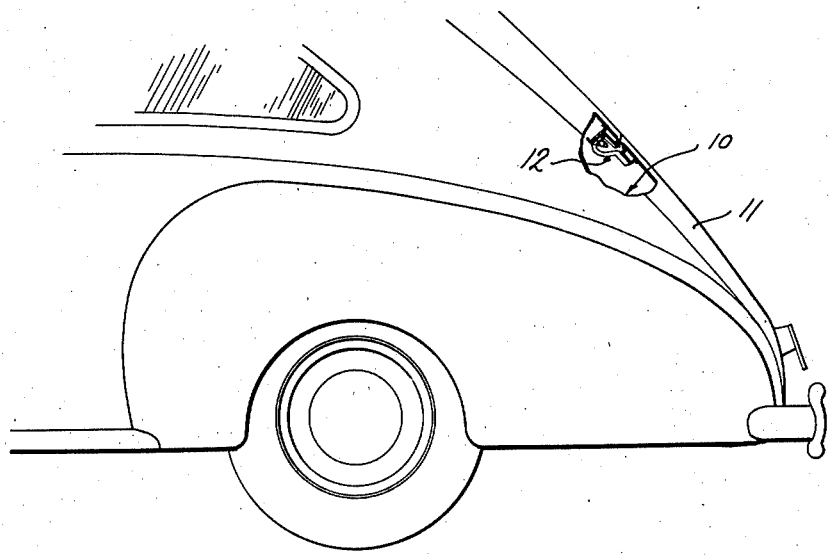
Figure 1 is a fragmentary elevational view, partly in section, of a portion of a vehicle body having a deck closure hinged to the body structure in accordance with the teachings of this invention.

In Figure 1 of the drawings, I have illustrated a portion of the rear end of a motor vehicle body having a storage compartment 10 accessible through an opening in the rear deck of the body and having a closure 11 for normally closing the opening. The closure 11 is hingedly connected at its upper end to the adjacent body structure by means of a concealed hinge 12 and it will be noted from Figure 1 that the hinge is of such construction as to occupy the minimum space within the compartment 10. This feature is, of course, advantageous in that it not only renders it possible to utilize practically the entire area of the compartment 10 for storage purposes, but also minimizes the danger of the hinge marring the contents of the compartment when the deck closure 11 is swung between the open and closed positions thereof.

Figure 3:
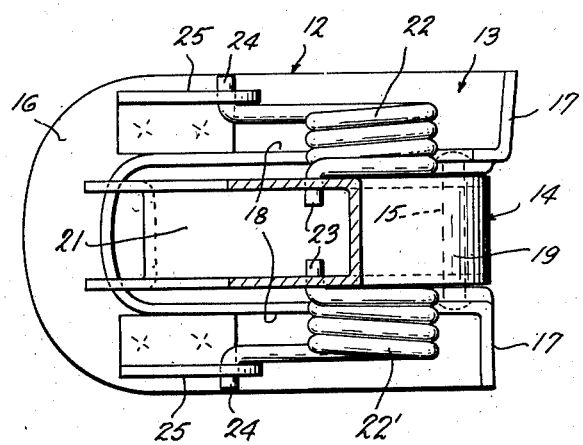
Figure 3 is a sectional view taken substantially on the plane indicated by the line 3—3 of Figure 2.

Upon reference to Figures 2 to 4, inclusive, it will be noted that the hinge 12 comprises a fixed part 13 and a movable part 14 pivotally connected to the fixed part by means of a pin 15 for swinging movement between the two positions shown in Figure 2 relative to the fixed part. The fixed part 13 is secured to the body structure within the compartment 10 and the movable part 14 is secured to the inner side of the deck closure 11, with the result that the hinge is thoroughly concealed from view.

The fixed section 13 of the hinge comprises a substantially U-shaped portion 16 having the free ends of the leg portions bent laterally to provide extensions 17. In the present illustrative embodiment of the invention, the extensions 17 are secured to the body structure adjacent the top edge of the closure 11 and the U-shaped portion 16 is secured to an angularly extending supporting panel of the body structure. If desired, the fixed section 13 of the hinge may be reinforced by providing a continuous lateral flange on the inner edges of the U-shaped portion and extensions 17.

The cooperating movable section 14 is substantially channel-shaped in cross section and has a width less than the distance between the legs of the U-shaped portion 16 to permit extending the end 19 of the movable section 14 between the extremities of the legs of the U-shaped portion 16. Upon reference to Figure 3, it will be noted that the pivot pin 15 extends through the side flanges at the end 19 of the movable section 14 and also projects through the reinforcing flanges 18 extending laterally from the U-shaped portion 16. As a result, the two sections are effectively pivotally connected together to permit section 14 to be swung between the two positions shown in Figure 2.

In Figure 2 of the drawings, I have shown the movable section 14 as having a substantially straight portion 20 arranged in a plane substantially perpendicular to the plane of the end portion 19 and connected to the end portion 19 through the medium of an arcuate portion 21.

The portion 20 is also channel-shaped in cross section and the base part thereof is adapted to be secured to the inner side of the closure 11.

The two cooperating sections of the hinge are also connected to each other by means of a pair of coiled torsion springs 22 and 22' located on opposite sides of the path of travel of the section 14 of the hinge. The inner ends of the coil springs are provided with laterally inwardly projecting extensions 23 extending through aligned openings in the adjacent flanges of the channel-shaped movable section 14, and the outer ends of the coil springs are provided with laterally outwardly projecting extensions 24 extending through aligned openings formed in suitable lugs 25. The lugs 25 are welded or otherwise secured to the fixed section 13 of the hinge at opposite sides of the path of travel of the cooperating movable section 14. Upon reference to Figure 2, it will be noted that the extensions 24 on the outer ends of the springs are supported by the lugs 25 in such a position with respect to the pivot pin 15 as to require movement of the extensions 23 across a plane designated by the reference character 26 and including both the extensions 24 and the axis of the pin 15. In other words, the arrangement is such that the extensions 23 on the inner ends of the springs move across the plane 26 when the closure is swung between the two positions thereof shown in Figure 2 of the drawings.

In the specific embodiment of the invention shown herein for the purpose of illustration, the inner extensions 23 of the coil springs assume a position above the plane 26 when the closure is in its closed position, with the result that both springs act to resist opening movement of the closure or, in other words, to hold the closure in its closed position. On the other hand, when the closure is in its open position shown by the dotted lines in Figure 2, the inner extensions 23 of the coil springs assume a position below the plane 26 and, as a consequence, the springs act to hold the closure in its open position. It will, of course, be understood from the above that as the inner extensions 23 of the springs move from one side of the plane 26 to the other, the springs act to assist continued movement of the closure.

Thus, from the foregoing, it will be observed that I have provided a relatively simple hinge construction embodying means for not only yieldably holding the closure in its closed and open positions but, in addition, for assisting movement of the closure between these two positions. It will further be apparent that my hinge construction is relatively compact and does not occupy an appreciable space within the storage compartment.

What I claim as my invention is:

1. A hinge for closures, comprising a substantially U-shaped section, a cooperating section having one end extending between the leg portions of the first section and pivotally connected to said leg portions, spring means having axially aligned coiled portions located at opposite sides of the path of swinging movement of the second section with the axis thereof extending substantially parallel to the axis of pivotal movement of the second hinge section and with the outer ends connected to the U-shaped section in spaced relation to the pivotal connection between the sections, the inner end portions of the coiled portions of the spring being connected to the second section between the outer ends aforesaid of the spring means and the pivotal connection between the hinge sections for movement with the second section across a plane including both the outer ends of the spring means and the axis of pivotal connection between the sections.

2. A hinge for closures, comprising a substantially U-shaped section, a cooperating hinge section having a U-shaped section extending in a plane perpendicular to the plane of the first U-shaped section and having one of the leg portions extending between the legs of the first named U-shaped section, means pivotally connecting the leg aforesaid of the second U-shaped section to the legs of the first U-shaped section, spring means having axially aligned coiled portions located at opposite sides of the path of swinging movement of the second section with the axis thereof extending substantially parallel to the axis of pivotal movement of the second section and with the outer ends respectively connected to the legs of the first U-shaped section in spaced relation to the pivotal connection between said sections, the inner ends of the coiled portions of said springs being connected to the leg aforesaid of the second U-shaped section between the outer ends of said springs and the pivotal connection between said sections for movement with the second section across a plane including both the outer ends of the springs and the axis of pivotal connection between the sections.

WILLIAM C. DEVEREAUX.